Feb. 22, 1927.
C. TEMPEST
1,618,688
CANISTER OR CONTAINER FOR TEA, COFFEE, AND THE LIKE
Filed Sept. 19. 1925
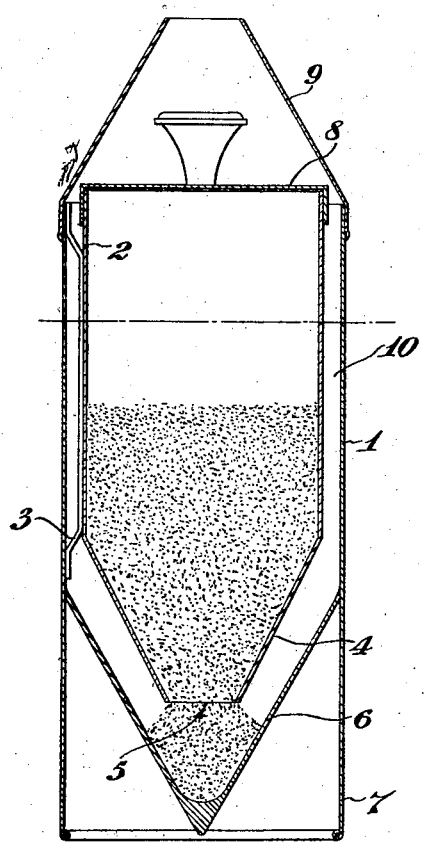
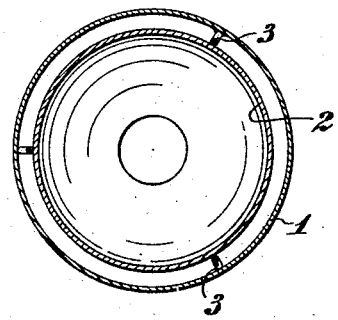
INVENTOR
Charles Tempest Patented Feb. 22, 1927.

1,618,688

UNITED STATES PATENT OFFICE.

CHARLES TEMPEST, OF LONDON, ENGLAND.

CANISTER OR CONTAINER FOR TEA, COFFEE, AND THE LIKE.

Application filed September 19, 1925, Serial No. 57,436, and in Great Britain September 19, 1924.

This invention relates to canisters or containers for tea, coffee and the like, and has for its object the provision of a canister or container of simple construction, having no moving parts, which will automatically and expeditiously deliver a definite quantity of its contents when required.

A canister or container constructed according to my invention comprises an inner casing constituting the container proper mounted within a closed-bottom outer casing in such a manner that a passage or space exists between said two casings, the inner casing terminating short of the outer casing at the lower end. The said lower end of the inner casing has a nozzle adapted to deliver a small and substantially definite portion of the contents by gravity into the bottom of the outer casing.

In order to deliver the small and substantially definite portion of the contents of the device which has passed into the outer container, the device is inverted, whereupon said portion passes through the passage between the casing walls and is delivered from a nozzle provided.

Preferably the passage between the two casings is of annular form or extends completely around the inner casing, and the inner casing is furnished at its upper end with a detachable lid, and the outer casing at its upper end with a detachable nozzle which is detached in order to give access to the lid and serves for the final delivery of the contents of the device.

The invention will be the more readily understood by reference to the following description and the accompanying sheet of drawings illustrating a preferred construction of canister or container in accordance therewith. In the drawings:—

Figure 1 is a vertical sectional view; and,

Figure 2 is a cross-sectional view of the device.

Referring to the drawings, the device illustrated therein comprises a cylindrical outer casing 1, and a cylindrical inner casing 2 concentrically arranged within said outer casing, the said inner casing 2 being secured in position by means of arched wires or strips 3 longitudinally disposed and constituting distance pieces.

The inner casing 2 is, at its lower end 4, tapered in conical fashion to form a nozzle 5, and the outer casing 1 is provided at the bottom with a V-shaped well 6, the wall of which is more or less parallel with the wall of the tapered lower end of the inner casing.

The outer casing is, at the lower end, provided with an extended skirt portion 7 which extends as far as or beyond the lowest point of the wall 6 and serves as a foot, enabling the device to stand in a vertical position. Said skirt 7 may consist of an extended portion of the outer casing 1, the well 6 in this case being a separate member inserted and secured within the said outer casing.

The inner casing 2 is furnished at its upper end with a detachable lid 8, and the outer casing is furnished at its upper end with a detachable conical nozzle cap 9 which is detached in order to give access to the lid 8.

It will be observed that the lower end or nozzle of the inner casing finishes short of the lower end or wall of the outer casing, and when the device is placed down in the position illustrated so that it stands on the skirt 7, a substantially definite portion of the contents of the inner casing 2 falls by gravity into the well 6; that is to say, the lowermost portion of the contents of the inner casing falls until it attains the level of the nozzle extremity 5, whereupon the said nozzle becomes choked and prevents a further amount of the contents falling. The said portion of the contents is delivered by inverting the device whereupon said portion, or the greater part thereof, passes down the annular passage 10 between the two casings and issues from the nozzle cap 9. Allowance is made for the portion which falls back into the inner casing via the nozzle 5 during such inverting operation.

The portion of the contents which passes from the inner casing 2 into the well 6 via the nozzle 5 is of a substantially definite and predetermined size, and is dependent upon the distance between the said nozzle extremity of the inner casing and the wall of the well.

It is to be understood that various modifications of the above-described construction may be adopted, without departing from the scope of the invention. For instance, the skirt extension of the outer casing may have a closed bottom, separate and attached to said skirt by a folded over seam or otherwise. In this case, the tapered lower end or well of the outer casing is not completely closed but meets the closed bottom which closes it and which may be slightly pressed out in continuation of its tapered shape.

Again, the device may be supported in trunnion fashion in a suitable stand, being so mounted as normally to assume an upright position. In this case, it is simply swung over about its pivots in order to deliver the portion of its contents. In this case, the delivery nozzle or spout may be arranged at one side, or two delivery spouts provided at opposite sides at any suitable point up the outer casing, and the outer casing need not extend as high as the inner casing and will be closed at its top except where the spout or spouts occur.

I claim:—

1. A dispensing canister for tea, coffee, and the like, comprising an inner casing constituting a container and having a dispensing outlet at its lower end, and an outer casing surrounding the inner casing and spaced therefrom to provide a discharge passage, a discharge nozzle at the upper end of the outer casing, and a bottom at the lower end of said outer casing spaced from the outlet of the inner casing and having means whereby a substantially definite portion of the contents of the inner casing may be delivered by gravity into said bottom of the outer casing, so that upon the device being inverted the portion aforesaid of the contents will pass through the discharge passage and out of the said nozzle.

2. A dispensing canister of the class described including an inner container having an outlet at its lower end, a detachable lid for the other end of the container, an outer casing surrounding the inner container and spaced therefrom to provide a discharge passage, a nozzle fitted to the upper end of the outer casing and communicating with the discharge passage, and a measuring bottom wall carried by the outer casing and spaced from the outlet of the inner container and adapted to receive an increment of the contents of the container from said outlet, whereby the inversion of the canister will throw the increment of material into the said discharge passage.

3. A canister adapted to be inverted to dispense a measured portion of its contents comprising nested inner and outer casings spaced to provide a passage between them, a tapered closed bottom for the outer casing providing a receiving well communicating with said passage, and a tapered nozzle formed at the lower end of the inner casing to deliver a portion of the contents by gravity into the well in the bottom of the outer casing.

4. A container of the class described comprising laterally spaced nested inner and outer casings, said casings being for their main part cylindrically shaped and concentrically arranged with respect to one another, the inner casing having a nozzle at its lower end discharging into the outer casing, means for limiting the amount discharged from said nozzle, and a nozzle at the upper end of said outer casing to receive the discharge from the inner casing on the inversion of the container.

5. A container of the class described comprising laterally spaced nested inner and outer casings, the inner casing having a nozzle at its lower end discharging into the outer casing, means for limiting the amount discharged from said nozzle, and a detachable cone-shaped nozzle cap at the upper end of said outer casing to receive the discharge from the inner casing on the inversion of the container.

6. A container of the class described comprising laterally spaced nested inner and outer casings, said casings being for their main part cylindrically shaped and concentrically arranged with respect to one another, the inner casing having a nozzle at its lower end discharging into the outer casing, means for limiting the amount discharged from said nozzle, a nozzle at the upper end of said outer casing to receive the discharge from the inner casing on the inversion of the container, and a skirt portion depending from the body of the outer casing at its lower end to form a support for the container.

7. A container of the class described comprising laterally spaced nested inner and outer casings, arched wire distance pieces longitudinally disposed between the inner and outer casings, the inner casing having a nozzle at its lower end discharging into the outer casing, means for limiting the amount discharged from said nozzle, and a nozzle at the upper end of said outer casing to receive the discharge from the inner casing on the inversion of the container.

8. A container of the class described comprising laterally spaced nested inner and outer casings, the inner casing having a nozzle at its lower end discharging into the outer casing, means for limiting the amount discharged from said nozzle, and a nozzle at the upper end of said outer casing to receive the discharge from the inner casing on the inversion of the container.

In testimony whereof I have affixed my signature hereto this 10th day of September 1925.

CHARLES TEMPEST.